July 24, 1923.

C. L. OCZKOWSKI 1,463,060

ANTISKIDDING DEVICE

Filed Feb. 21, 1922

Inventor
C. L. Oczkowski

By F. R. Bryant
Attorney

Patented July 24, 1923.

1,463,060

UNITED STATES PATENT OFFICE.

CONSTANTINE L. OCZKOWSKI, OF BUNELL, COLORADO.

ANTISKIDDING DEVICE.

Application filed February 21, 1922. Serial No. 538,156.

*To all whom it may concern:*

Be it known that I, CONSTANTINE L. OCZ-KOWSKI, a citizen of the United States of America, residing at Bunell, in the county of Adams and State of Colorado, have invented certain new and useful Improvements in Antiskidding Devices, of which the following is a specification.

This invention relates to certain new and useful improvements in anti-skidding devices for use in connection with vehicle wheels equipped with cushion tires, particularly of the pneumatic type, and has particular reference to the provision of an improved form of link for the construction of cross chains for preventing skidding as well as the cross chains produced by the use of a plurality of said links in connected relation.

The primary object of the invention is to provide a simple and durable form of cross chains wherein the same is constructed of simple links having effective means for preventing side skidding as well as forward skidding of the vehicle equipped with the same.

With the above general objects in view and others that will appear as the nature of the invention is better understood, the same consists of the novel form, combination and arrangement of parts hereinafter more fully described, shown in the accompanying drawings and claimed.

Figure 1:
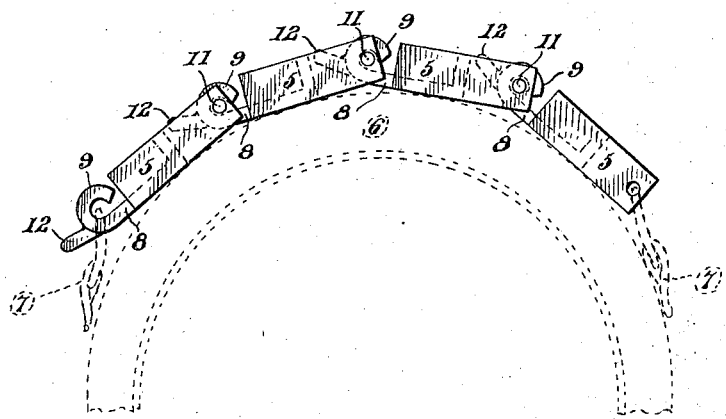
Figure 2:
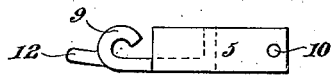
Figure 3:
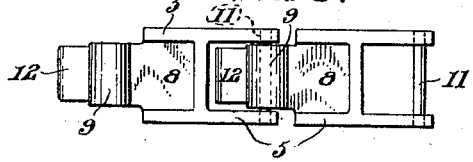
Figure 4:
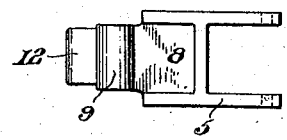
Figure 5:
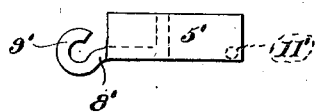
Figure 6:
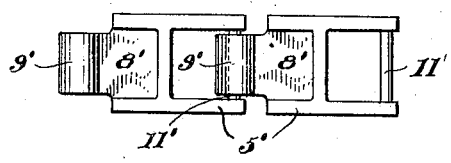
Figure 7:
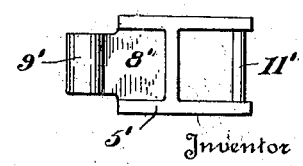

In the drawings, wherein like reference characters designate corresponding parts throughout the several views, Figure 1 is a side elevational view of a cross chain constructed in accordance with the present invention and shown operatively disposed upon a pneumatic tire, a portion of which is indicated in outline by dotted lines together with several links of any desired form of attaching means, Figure 2 is a side elevational view of one of the links of the device shown in Fig. 1, Figure 3 is a top plan view of two of said links connected, Figure 4 is a top plan view of the device shown in Fig. 2, Figure 5 is a view similar to Fig. 2 of a modified form of the invention, Figure 6 is a view similar to Fig. 3 of two connected links of the form shown in Fig. 5, and Figure 7 is a view similar to Fig. 4 of the link shown in Fig. 5.

Referring more in detail to the several views, and particularly to Figs. 1 to 4 inclusive, the invention is shown as embodying a plurality of links 5 connected in end to end relation so as to freely pivot relative to each other for conforming to the outer surface of the usual pneumatic tire shoe 6 with which automobiles are equipped, the end links being attached so as to remain in proper position by any suitable means such as the usual attaching chains several links of which are indicated broadly by dotted lines at 7.

In this form of the invention, each link comprises an H-shaped body portion, the legs of which at one end are connected at their bottom edges by a web 8 which extends outwardly beyond the end edges of said legs and is return bent as at 9 into hook formation as clearly shown in the several views. The legs of the body portion at the other end are provided with alined openings 10 in which is suitably fixed a pivot pin 11 for a pivotal and detachable reception of the hooks on the adjacent ends of the adjacent links, whereby a plurality of said links may be readily connected to provide a cross chain of the desired size. In this form of the invention the hook-shaped member 9 is provided with a longitudinally projecting tongue 12, substantially co-extensive with the web 8, the relationship being such that when the links are operatively disposed upon the tire in angular relation to each other the tongue 12 will project slightly beyond the outer edges of the body member 5 in position to readily dig into the road and prevent sidewise skidding. It is also noted that in the use of the cross chain the links will be continually swung relative to each other so that the space between the legs which accommodate the tongue 12 of the adjacent links will be effectively kept clean. In other words, the tongue 12 will serve to eject any mud which may lodge between the legs at this end of each link.

In the form of the invention illustrated in Figs. 5 to 7 inclusive, the construction is substantially the same involving the link 5' of substantially H-shape in plan with the legs at one end connected by a web 8' which is extended and return bent into hook shape as at 9'. In this form of the invention, however, the tongue 12 is omitted and the hook-shaped member 9 is downwardly offset so as to lie inwardly of the plane of the outer edges of the body member without diminishing the heft or size of the hook-shaped member. It is to be understood that the offset position of the hook-shaped member 9 will prevent the cross chain from shifting or moving relative to the tread of the tire shoe 6 when the said chain is in engagement with the roadbed. The portion of each hook-shaped member offset from the bottom plane of the link will be embedded in the tread of the tire and, therefore, will perform the function set forth above. In this form of the invention the other legs at the other end of the body portion are connected by a transverse pivot pin 11′ adapted to pivotally and detachably receive the hook-shaped member 9′ of the adjacent link.

It will be understood that the present cross chains may be employed between two side chains in the usual manner or they may be separately attached at the desired point by a felly or spoke engaging attaching devices, both of which are well known in the art and are accordingly not shown as it forms no part of the present invention.

It is believed that the construction and operation as well as the advantages of the present invention will be readily understood and appreciated by those skilled in the art.

While there is herein shown and described the preferred embodiment of the present invention, it is nevertheless to be understood that minor changes may be made therein without departing from the spirit and scope of the invention as claimed.

What is claimed as new is:—

1. In an anti-skidding cross chain for motor vehicles, a link including a body portion of H-shape in plan with the legs thereof at one end connected at their bottom edges by a web, said web being extended beyond the end edges of said legs into hook shape, and a pivot pin between and connecting the legs at the opposite end of the body portion for pivotal and detachable reception of the hook-shaped member of another similar link.

2. In an anti-skidding cross chain for motor vehicles, a link including a body portion of H-shape in plan with the legs thereof at one end connected at their bottom edges by a web, said web being extended beyond the end edges of said legs into hook shape, and a pivot pin between and connecting the legs at the opposite end of the body portion for pivotal and detachable reception of the hook-shaped member of another similar link, said hook-shaped member being inwardly offset within the plane of the outer edges of the H-shaped body portion.

In testimony whereof I affix my signature.

CONSTANTINE L. OCZKOWSKI.